(12) United States Patent
Cheng (10) Patent No.: US 10,146,047 B1
(45) Date of Patent: Dec. 4, 2018

(54) OPTICAL BASE STATION

(71) Applicant: HTC Corporation, Taoyuan (TW)

(72) Inventor: Yen-Fang Cheng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/920,456

(22) Filed: Mar. 14, 2018

Related U.S. Application Data (60) Provisional application No. 62/570,671, filed on Oct. 11, 2017.

(51) Int. Cl.
| | | |
|---|---|---|
| G02B 26/10 | (2006.01) | |
| G02B 6/42 | (2006.01) | |
| G06F 3/03 | (2006.01) | |
| G06F 3/01 | (2006.01) | |

(52) U.S. Cl.
CPC ......... *G02B 26/103* (2013.01); *G02B 6/4206* (2013.01); *G06F 3/012* (2013.01); *G06F 3/0308* (2013.01)

(58) Field of Classification Search
CPC ............................ G02B 26/103; G02B 6/4206
See application file for complete search history.

(56) References Cited

U.S. PATENT DOCUMENTS

2006/0268549 A1* 11/2006 Oehlke .................. F21S 10/06
                                                                362/276
2016/0131761 A1   5/2016 Yates et al.

FOREIGN PATENT DOCUMENTS

| | | |
|---|---|---|
| CN | 102378919 | 3/2012 |
| CN | 104390952 | 3/2015 |
| TW | 201643463 | 12/2016 |
| TW | 201735565 | 10/2017 |

OTHER PUBLICATIONS

"Optical encoders and LiDAR scanning", retrieved from http://www.renishaw.com/en/optical-encoders-and-lidar-scanning--39244.
Ben Lang, "Valve Confirms New SteamVR Tracking Base Station Coming This Year", retrieved from https://www.roadtovr.com/valve-confirms-new-steamvr-tracking-lighthouse-base-station-release-date-2017-htc-vive/.
"Office Action of Taiwan Counterpart Application," dated Sep. 26, 2018, pp. 1-6.

\* cited by examiner

*Primary Examiner* — Ryan A Lepisto
(74) *Attorney, Agent, or Firm* — JCIPRNET (57) ABSTRACT

An optical base station including a base, a light source, a rotation plate and an optical fiber is provided. The light source is disposed on the base for providing a light beam. The rotation plate is disposed on the base. The optical fiber is disposed on the base and has an input end and a first output end. The rotation plate drives the optical fiber to rotate around a rotation axis. The rotation axis passes through the input end. The light beam enters the optical fiber from the input end and is output from the first output end after being transmitted in the optical fiber.

16 Claims, 9 Drawing Sheets

OPTICAL BASE STATION

CROSS-REFERENCE TO RELATED APPLICATION

This application claims the priority benefit of U.S. provisional application Ser. No. 62/570,671, filed on Oct. 11, 2017. The entirety of the above-mentioned patent application is hereby incorporated by reference herein and made a part of this specification.

FIELD OF THE INVENTION

The application is directed to a base station and more particularly, to an optical base station.

DESCRIPTION OF RELATED ART

Virtual reality (VR) systems have become one of the major popular techniques available on the market. A user, after wearing a VR apparatus on the head, can view a three dimensional (3D) image with a display portion in front of the eyes, thereby experiencing reality and vividness. However, in order to construct a correct VR space, an optical base station for providing a spatially-positioning datum has to be equipped.

Figure 1:
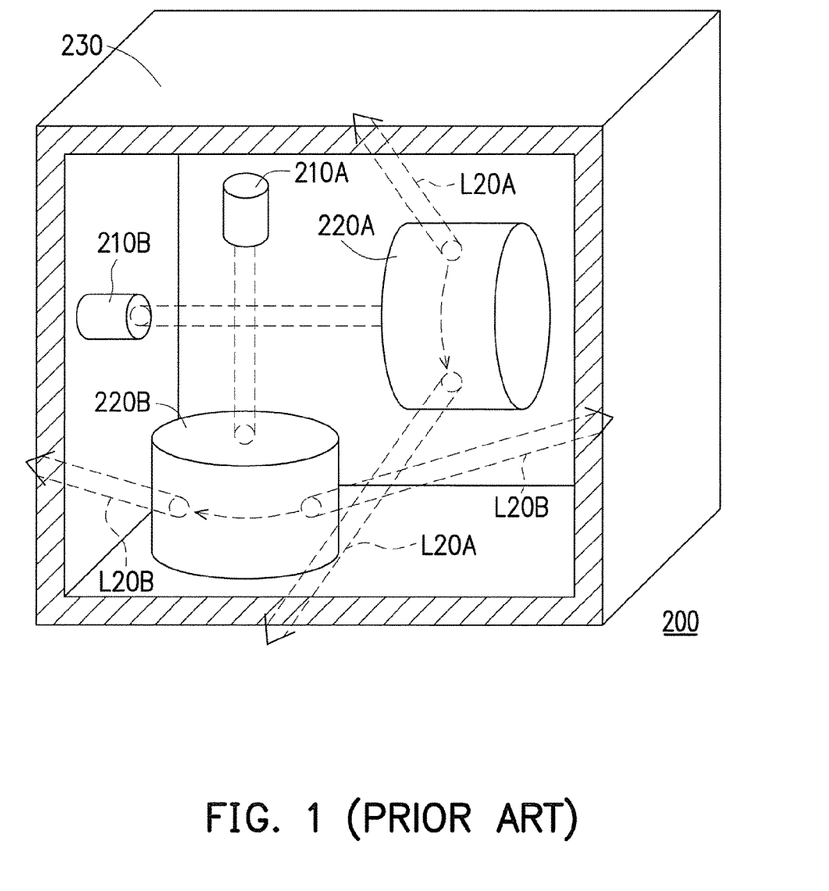
FIG. 1 is a schematic view of a conventional optical base station.

FIG. 1 is a schematic view illustrating a conventional optical base station. Referring to FIG. 1, in order to two-dimensionally scan a space, a conventional optical base 200 uses two rotors 220A and 220B in cooperation with two light sources 210A and 210B. A light beam L20A provided by the light source 210A, after entering the rotor 220A, rotates with the rotor 220A to scan a surrounding space. A light beam L20B provided by the light source 210B, after entering the rotor 220B, rotates with the rotor 220B in a direction different from that of the light beam L20A to scan the surrounding space. However, because the rotors 220A and 220B and the two light sources 210A and 210B are respectively located at the top, the bottom, the left, and the right of the optical base 200, ranges capable of being scanned with the light beams L20A and L20B are restricted by a housing 230 of the optical base 200. Additionally, the two rotors 220A and 220B may also cause difficulty in reducing the volume of the optical base 200 and difficulty in cost down.

Figure 2:
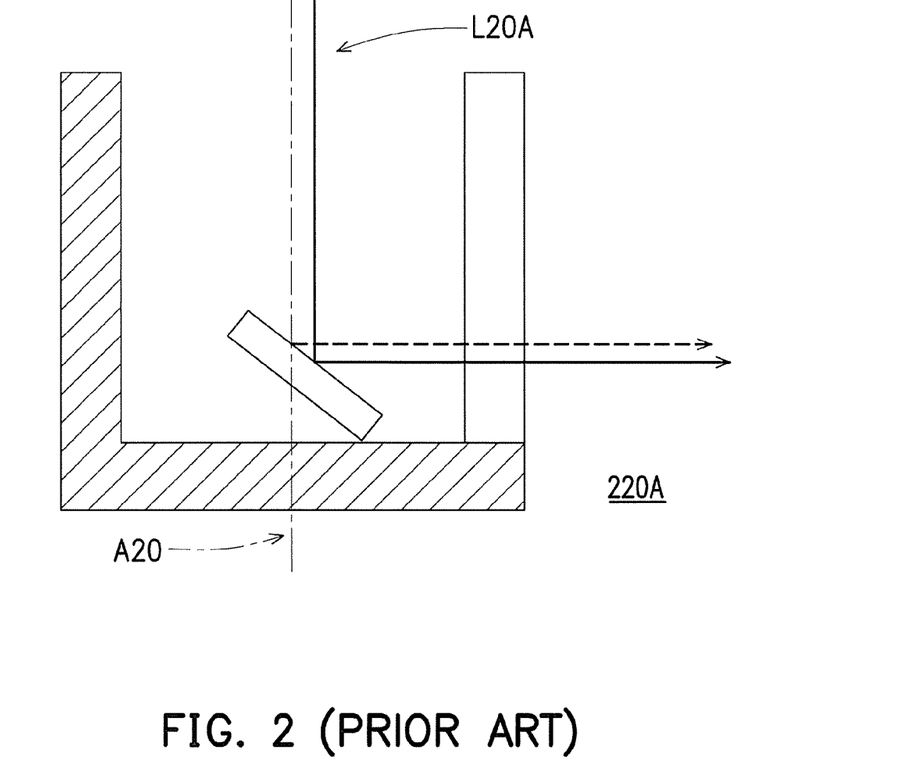
FIG. 2 is a schematic cross-sectional view of a single rotor depicted in FIG. 1.

FIG. 2 is a schematic cross-sectional view of a single rotor depicted in FIG. 1. Referring to FIG. 2, due to the presence of an assembly tolerance, a transmission path of the light beam L20A may not coincide with a rotation axis A20 of the rotor 220A as what is expected. As such, hitting points of the light beam L20A on the reflector in the rotor 220A may change with rotation of the rotor 220A, which may cause the light beam L20A reflected by the reflector to shift vertically, such that optical scanning stability may be influenced.

SUMMARY

The application provides an optical base station capable of resolving the problem caused by an assembly deviation.

An optical base station including a base, a light source, a rotation plate and an optical fiber is provided by the application. The light source is disposed on the base for providing a light beam. The rotation plate is disposed on the base. The optical fiber is disposed on the base and has an input end and a first output end. The rotation plate drives the optical fiber to rotate around a rotation axis. The rotation axis passes through the input end. The light beam entering the optical fiber from the input end is transmitted in the optical fiber and output from the first output end.

To sum up, in the optical base station of the application, positions where the input end and the first output end of the optical fiber are disposed on the rotation plate are fixed. Thus, the problem of an unstable optical scanning effect caused by the assembly deviation can be prevented.

To make the above features and advantages of the invention more comprehensible, embodiments accompanied with drawings are described in detail below.

DESCRIPTION OF EMBODIMENTS

Figure 3:
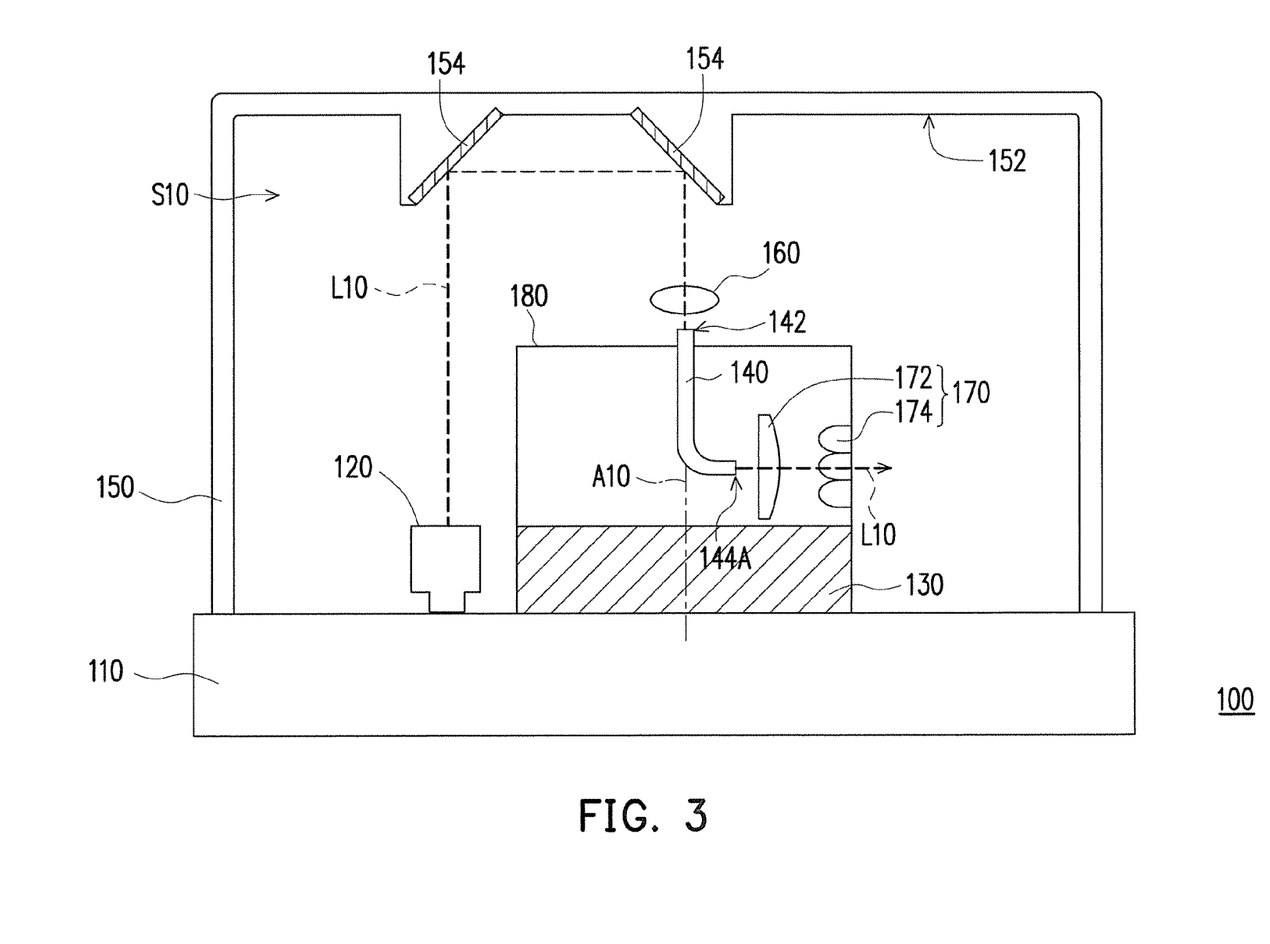
FIG. 3 is a schematic view of an optical base station according to an embodiment of the invention.

FIG. 3 is a schematic view of an optical base station according to an embodiment of the invention. Referring to FIG. 3, an optical base station 100 of the present embodiment includes a base 110, a light source 120, a rotation plate 130 and an optical fiber 140. The light source 120 is disposed on the base 110 for providing a light beam L10. The rotation plate 130 is disposed on the base 110. The optical fiber 140 is disposed on the base 110 and has an input end 142 and a first output end 144A. The rotation plate 130 drives the optical fiber 140 to rotate around a rotation axis A10. The rotation axis A10 passes through the input end 142. The light beam L10 entering the optical fiber 140 from the input end 142 is transmitted in the optical fiber 140 and output from the first output end 144A.

In the optical base station 100 of the present embodiment, a position of the input end 142 of the optical fiber 140 on the rotation plate 130 is fixed, and the rotation axis A10 passes through the input end 142. The position of the input end 142 is equivalent to the hitting position of the light beam located on the reflector in the related art, which may ensure that the input end 142 is located on the rotation axis A10. Furthermore, a position of the first output end 144A on the rotation plate 130 is also fixed. In this way, it may ensure that the light beam L10 is output stably from a specified position. Thus, the problem that the located position on the reflector changes due to the deviation between the light beam and the rotation axis of the reflector in the related art does not occur, and the finally output light beam does not shift vertically. Thereby, the optical base station 100 of the present embodiment may provide a stable optical scanning effect.

On the other hand, because a spot shape of the light beam L10 will be re-shaped after being transmitted in the optical fiber 140, the spot shape output from the first output end 144A does not change with the rotation of the rotation plate 130, and a stable optical scanning effect can be obtained.

Moreover, the light source 120 and the rotation plate 130 of the present embodiment are both disposed on the same surface of the base 110. Thus, circuits required for driving the light source 120 and the rotation plate 130 all may be distributed on the same surface of the base 110. In this way, the light beam L10 output from the first output end 144A may scan the periphery of the base 110 at 360 degrees without dead space, and the interference caused by circuits at sides like what may occur in the related art can be prevented.

In the present embodiment, the optical base station 100 may further include a cover 150 disposed on the base 110. The light source 120, the rotation plate 130 and the optical fiber 140 are located in an accommodation space S10 formed by the cover 150 and the base 110. The cover 150 may isolate the light source 120, the rotation plate 130 and the optical fiber 140 from the outside, thereby preventing disturbance and pollution by foreign particles to enhance reliability of the optical base station 100 and extend the lifespan. The cover 150 is transparent to the light beam L10. In other words, it does not matter whether the cover 150 is transparent when being observed by human eyes, but it matters that a material of the cover 150 allows the light beam L10 in a wave band to pass through without blocking the light beam L10 or obviously weakening the intensity of the light beam L10.

In the present embodiment, the light source 120 is located beside the rotation plate 130 and thus, needs an adaptively designed optical system to guide the light beam L10 provided thereby to the input end 142. An inner top surface 152 of the cover 150 which is far away from the base 110 may have at least one reflecting portion 154, and in the present embodiment, two reflecting portions 150 are illustrated for example. The light beam L10 enters the input end 142 after being reflected by the two reflecting portions 154. However, by adjusting an angle of the light beam L10 when being emitted and a disposition angle of the reflecting portion 154, the light beam L10 may also be reflected by a single reflecting portion 154 and then enters the input end 142. Alternatively, other adaptive optical systems may be also be designed to achieve the same optical effect described above.

In the present embodiment, the optical base station 100 may further include a lens 160 disposed at the input end 142. The light beam L10 enters the input end 142 after passing through the lens 160. The lens 160 may be a condenser lens or other adaptive lenses. Certainly, the lens 160 may also be composed of a plurality of optical elements. The lens 160 may be fixed to the rotation plate 130 or may also be fixed to the cover 150 or the base 110.

In the present embodiment, the optical base station 100 may further include a lens module 170 disposed at the first output end 144A. The light beam L10, after being output from the first output end 144A, passes through the lens module 170 and is converted to have a linear spot. The light beam L10 output from the first output end 144A may originally be, for example, a dotted shape. The spot of the light beam L10 is converted into the linear spot with the use of the lens module 170 to facilitate optical scanning. However, with an adaptive design of the optical fiber 140, the spot of the light beam L10, after being output from the first output end 114A, may be made to be linear. The light beam L10 having the linear spot means that a shape of the light beam L10 hitting on an orthogonal plane substantially presents the linear shape. The lens module 170 of the present embodiment includes a condenser lens 172 and a lenticular lens sheet 174, but the application is not limited thereto. The divergent light beam L10 which is condensed by the condenser lens 172 enters the lenticular lens sheet 174. The lenticular lens sheet 174 is mainly used to change the spot shape. By adaptively designing the lenticular lens sheet 174, the light beam L10 has substantially the same intensity on each part of the linear spot thereof.

In the present embodiment, the optical base station 100 further includes a package 180 disposed on the rotation plate 130. The optical fiber 140 is embedded in the package 180. The input end 142 and the first output end 144A are exposed from the package 180 for inputting and outputting the light beam L10. Thus, positions of the input end 142 and the first output end 144A of the optical fiber 140 on the rotation plate 130 may be ensured. In addition, when the lens module 170 is disposed, the lens module 170 may also be embedded in the package 180 to maintain a relative position with respect to the first output end 144A.

Figure 4:
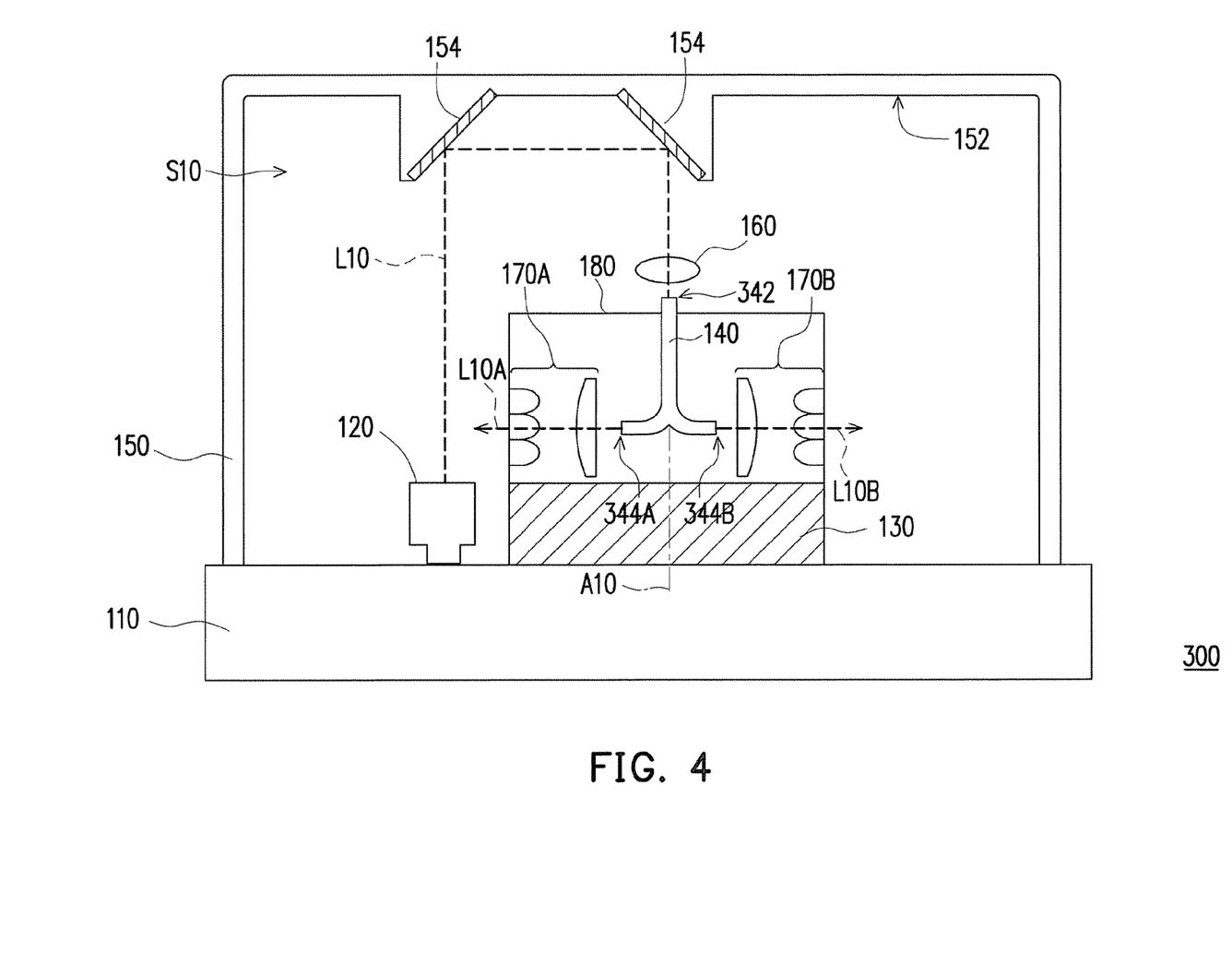
FIG. 4 is a schematic view of an optical base station according to another embodiment of the invention.
Figure 5:
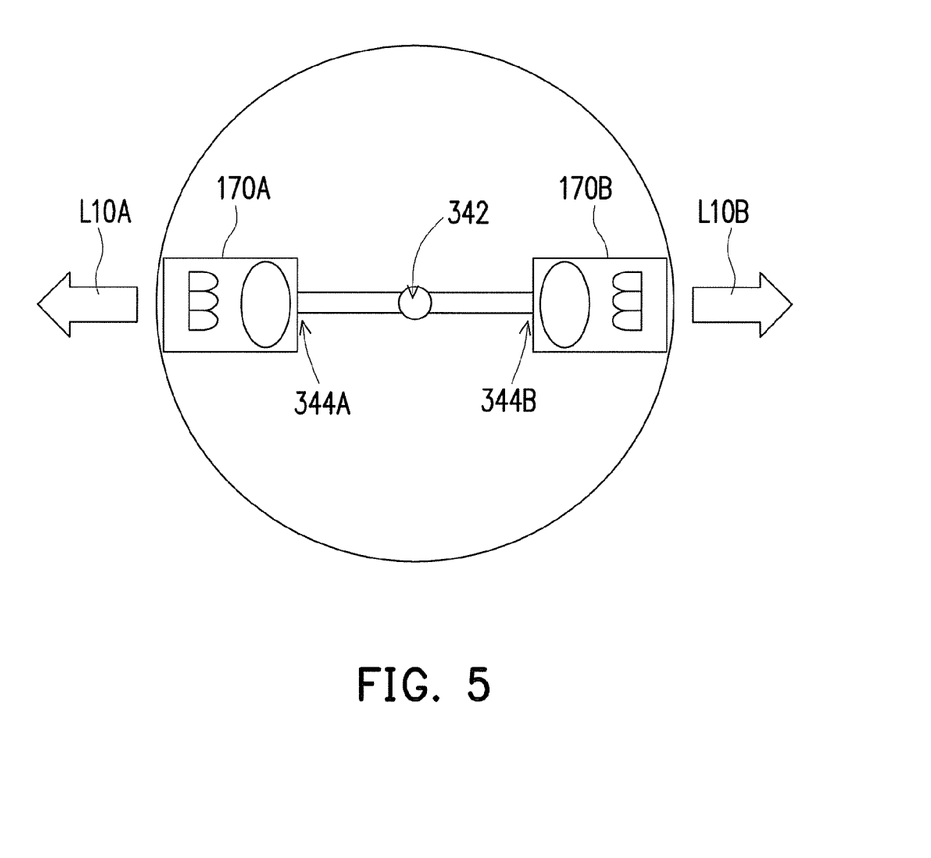
FIG. 5 is a schematic top view of the rotation plate depicted in FIG. 4.

FIG. 4 is a schematic view of an optical base station according to another embodiment of the invention. FIG. 5 is a schematic top view of the rotation plate depicted in FIG. 4. Referring to FIG. 4 and FIG. 5, an optical base station 300 of the present embodiment is substantially similar to the optical base station 100 illustrated in FIG. 3, and only difference therebetween will be described below. An optical fiber 340 of the optical base station 300 of the present embodiment has an input end 342, a first output end 344A and a second output end 344B. The light beam L10, after entering the optical fiber 340 from the input end 342, is divided to respectively output a first sub light beam L10A and a second sub light beam L10B from the first output end 344A and the second output end 344B. Thus, the first sub light beam L10A and the second sub light beam L20 may optically scan the surroundings simultaneously while the rotation plate 130 is rotated. Accordingly, an overall height of the optical base station 300 may be reduced, so as to reduce an overall volume to meet consumers' use preference.

Figure 6:
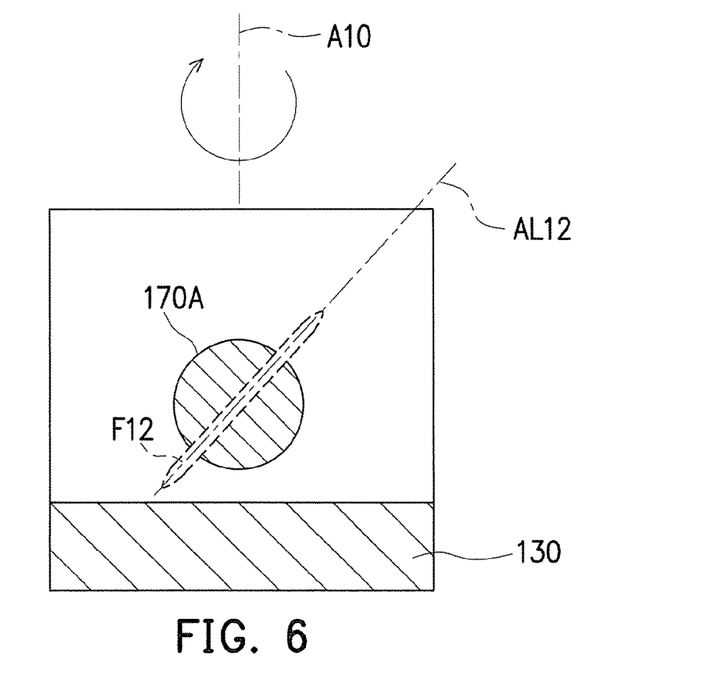
FIG. 6 is a schematic side view of the rotation plate depicted in FIG. 4 viewed from one side.
Figure 7:
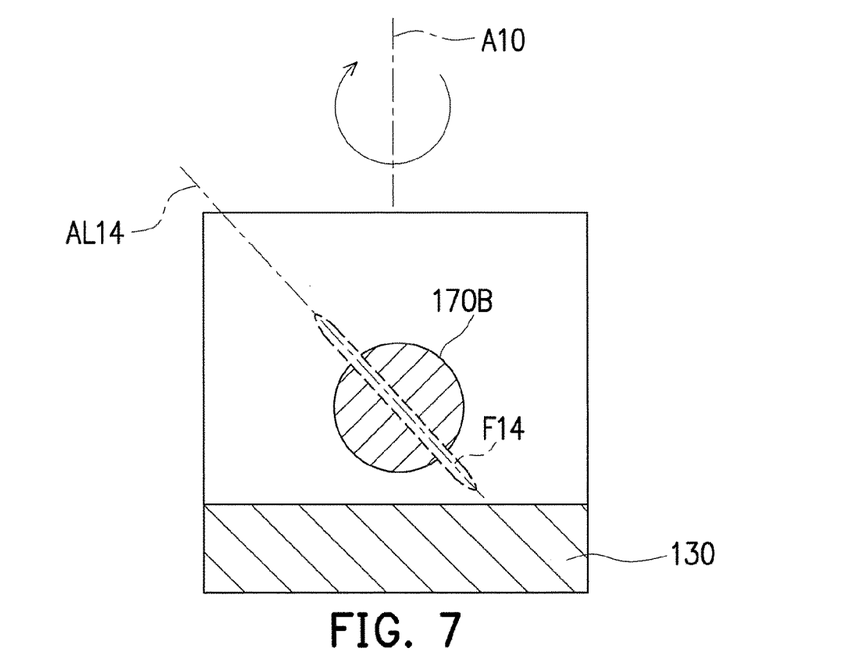
FIG. 7 is a schematic side view of the rotation plate depicted in FIG. 4 viewed from the other side.

In the present embodiment, the optical base station 300 may further include a first lens module 170A and a second lens module 170B respectively disposed at the first output end 344A and the second output end 344B. FIG. 6 is a schematic side view of the rotation plate depicted in FIG. 4 viewed from one side. Referring to FIG. 5 and FIG. 6, the first sub light beam L10A, after being output from the first output end 344A, passes through the first lens module 170A and is converted to have a first linear spot F12. FIG. 7 is a schematic side view of the rotation plate depicted in FIG. 4 viewed from the other side. Referring to FIG. 5 and FIG. 7, the second sub light beam L10B, after being output from the second output end 344B, passes through the second lens module 170B and is converted to have a second linear spot F14.

The rotation axis A10 is neither parallel nor vertical to a longitudinal axis AL12 of the first linear spot F12 and a longitudinal axis AL14 of the second linear spot F14. Specifically, by viewing the rotation plate 130 along a transmission direction of the first sub light beam L10A, the first linear spot F12 of the first sub light beam L10A may be seen, as illustrated in FIG. 6. In FIG. 6, the rotation axis A10 of the rotation plate 130 is a vertical line, the longitudinal axis AL12 of the first linear spot F12 is a straight line from upper right to lower left, and both are neither parallel nor vertical to each other. On the other hand, by viewing the rotation plate 130 along a transmission direction of the second sub light beam L10B, the second linear spot F14 of the second sub light beam L10B may be seen, as illustrated in FIG. 7. In FIG. 7, the rotation axis A10 of the rotation plate 130 is a vertical line, the longitudinal axis AL14 of the second linear spot F14 is a straight line from upper left to lower right, and both are neither parallel nor vertical to each other. Additionally, according to both FIG. 6 and FIG. 7, the longitudinal axis AL12 of the first linear spot F12 is not parallel to the longitudinal axis AL14 of the second linear spot F14.

In view of the conditions mentioned above, when the rotation plate 130 rotates around the rotation axis A10 to scan the surrounding space simultaneously with the first sub light beam L10A and the second sub light beam L10B, a same light sensor (which is not shown) located in the space receives the first sub light beam L10A and the second sub light beam L10B in turn. According to a time difference between reception times of the first sub light beam L10A and the second sub light beam L10B and incident angles of the first sub light beam L10A and the second sub light beam L10B, a relative position of the light sensor and the rotation plate 130 may be calculated, so as to achieve the purpose for spatially positioning the light sensor. In this way, the optical base station 300 of the present embodiment may two-dimensionally scan the space by using only one rotation plate 130, which may save a space occupied by the rotation plate 130, as well as save material and assembly cost in comparison with the related art. In this case, the first sub light beam L10A and the second sub light beam L10B are distributed in a manner with an included angle of 180 degrees, but the application is not limited thereto.

Figure 8:
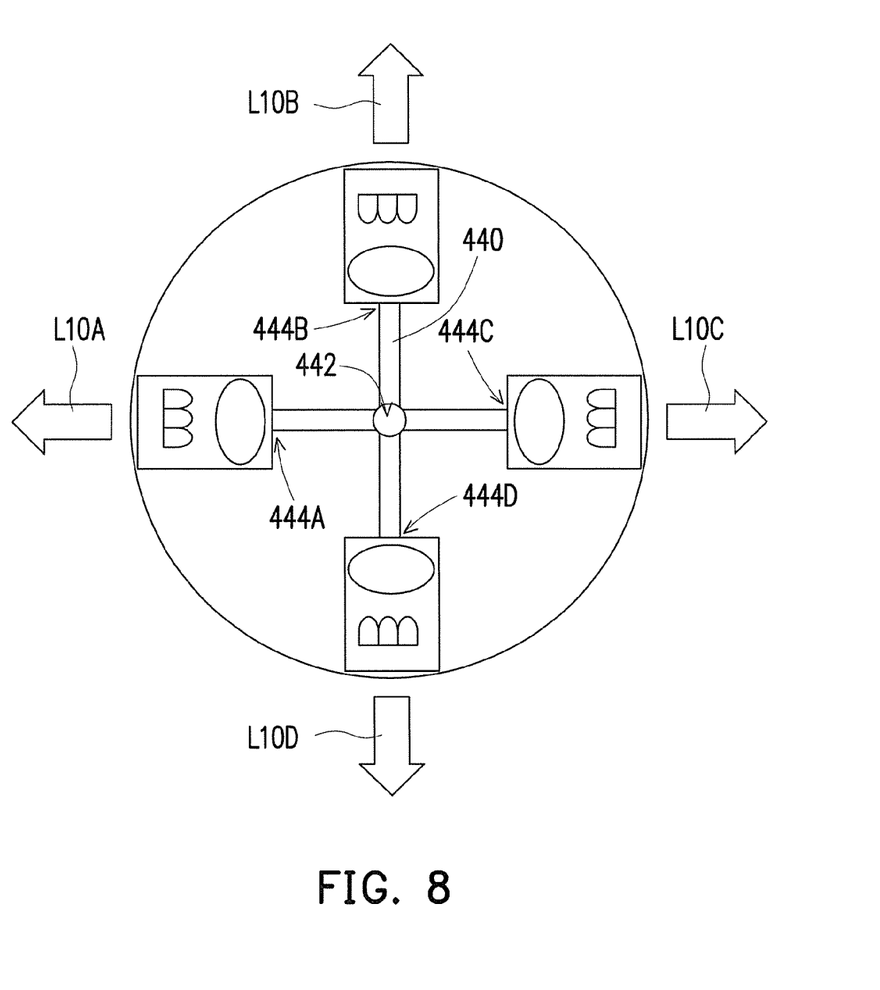
FIG. 8 is a schematic view of an optical base station according to another embodiment of the invention viewed from the above of the rotation plate.

FIG. 8 is a schematic view of an optical base station according to another embodiment of the invention viewed from the above of the rotation plate. Referring to FIG. 8, an optical base station of the present embodiment and the optical base station 100 illustrated in FIG. 3 are substantially similar, but different in the design of the optical fiber, and only difference therebetween will be described below. An optical fiber 440 of the optical base station of the present embodiment has an input end 442, a first output end 444A, a second output end 444B, a third output end 444C and a fourth output end 444D. The light beam L10, after entering the optical fiber 440 from the input end 442, is divided to respectively output a first sub light beam L10A, a second sub light beam L10B, a third sub light beam L10C and a fourth sub light beam L10D from the first output end 444A, the second output end 444B, the third output end 444C and the fourth output end 444D. Being similar to the previous embodiment, the space may be two-dimensionally scanned with the use of the first sub light beam L10A and the second sub light beam L20 and simultaneously with the use of the third sub light beam L10C and the fourth sub light beam L10D, thereby achieving a purpose of scanning at a doubled frequency by a single rotation plate. In this case, the first sub light beam L10A, the second sub light beam L10B, the third sub light beam HOB and the fourth sub light beam L10D are distributed in a manner with an included angle of 90 degrees, but the application is not limited thereto.

Figure 9:
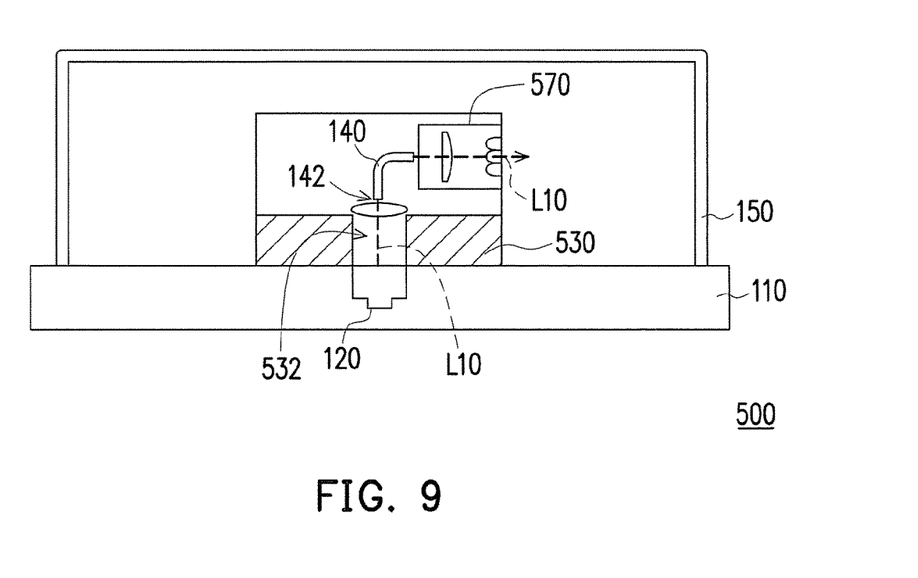
FIG. 9 is a schematic view of an optical base station according to yet another embodiment of the invention.

FIG. 9 is a schematic view of an optical base station according to yet another embodiment of the invention. Referring to FIG. 9, an optical base station 500 of the present embodiment is substantially similar to the optical base station 100 illustrated in FIG. 3, and only difference therebetween will be described below. A rotation plate 530 of the optical base station 500 of the present embodiment has a through hole 532, and the light beam L10 enters the optical fiber 140 from the input end 142 after passing through the rotation plate 530 from the through hole 532. Thus, the reflecting portions 154 as illustrated in FIG. 3 is not needed for the optical base station 500 of the present embodiment. In addition, a lens module 570 of the present embodiment is formed by assembling the condenser lens and the lenticular lens sheet in advance. By comparing the condenser lens and the lenticular lens sheet being separately assembled to the optical base station 500, the modulized lens module 570 may facilitate reducing the assembly time and enhancing alignment accuracy. In addition, the lens module 570 may also be a single lenticular lens or replaced by another lens module.

Figure 10:
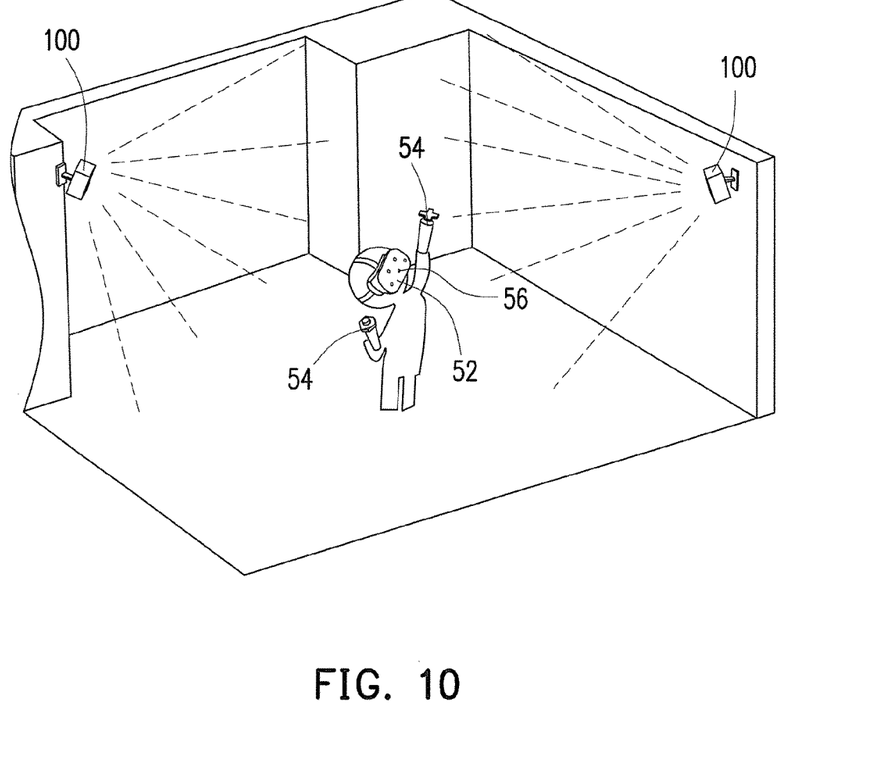
FIG. 10 is a schematic view of an architecture applying the optical base station depicted in FIG. 3.

FIG. 10 is a schematic view of an architecture applying the optical base station depicted in FIG. 3. Referring to FIG. 10, two optical base stations 100 illustrated in FIG. 3 are used in this application architecture. When a user wears a head-mounted display device 52 and holds a control handle 54 with each hand, the optical base stations 100 continuously and periodically emit light beams to a space where the user is located. There are a plurality of light sensors disposed on the head-mounted display device 52 and the control handles 54, but FIG. 10 only illustrates a light sensor disposed on the head-mounted display device 52. The light sensors 56 are capable of detecting the light beams emitted from the optical base stations 100. By analyzing time information related to the light beams detected by the light sensors 56 and geometric positions of the light sensors 56 on the head-mounted display device 52 and the control handles 54, instant position information regarding the head-mounted display device 52 and the control handles 54 in the space may be obtained, so as to provide a variety of VR applications to the user.

Based on the above, in the optical base station of the application, the positions of the input end and the first output end of the optical fiber on the rotation plate are fixed, the rotation axis passes through the input end, and it can be ensured that the light beam can be output stably from a specified position. Thus, the optical base station of the application can provide a stable optical scanning effect.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:
1. An optical base station, comprising:
a base;
a light source, disposed on the base for providing a light beam;
a rotation plate, disposed on the base;
an optical fiber, disposed on the base and having an input end and a first output end, wherein the rotation plate drives the optical fiber to rotate around a rotation axis, the rotation axis passes through the input end, and the light beam entering the optical fiber from the input end is transmitted in the optical fiber and output from the first output end; and
a cover, disposed on the base, wherein the light source, the rotation plate and the optical fiber are located in an accommodation space formed by the cover and the base, and the cover is transparent to the light beam.
2. The optical base station according to claim 1, wherein an inner top surface of the cover which is far away from the base has at least one reflecting portion, and the light beam enters the input end after being reflected by the reflecting portion.

3. The optical base station according to claim 1, further comprising a lens disposed at the input end, wherein the light beam enters the input end after passing through the lens.

4. The optical base station according to claim 1, wherein the optical fiber further has a second output end, the light beam, after entering the optical fiber from the input end, is divided to respectively output a first sub light beam and a second sub light beam from the first output end and the second output end.

5. The optical base station according to claim 4, further comprising a first lens module and a second lens module respectively disposed at the first output end and the second output end, wherein the first sub light beam, after being output from the first output end, passes through the first lens module and is converted to have a first linear spot, the second sub light beam, after being output from the second output end, passes through the second lens module and is converted to have a second linear spot, the rotation axis is neither parallel nor vertical to a longitudinal axis of the first linear spot and a longitudinal axis of the second linear spot, and the longitudinal axis of the first linear spot is not parallel to the longitudinal axis of the second linear spot.

6. The optical base station according to claim 1, wherein the optical fiber further has a second output end, a third output end and a fourth output end, and the light beam, after entering the optical fiber from the input end, is divided to respectively output a first sub light beam, a second sub light beam, a third sub light beam and a fourth sub light beam from the first output end, the second output end, the third output end and the fourth output end.

7. The optical base station according to claim 1, further comprising a package disposed on the rotation plate, wherein the optical fiber is embedded in the package, and the input end is exposed from the package.

8. The optical base station according to claim 1, wherein the rotation plate has a through hole, and the light beam enters the optical fiber from the input end after passing through the rotation plate from the through hole.

9. An optical base station, comprising:
a base;
a light source, disposed on the base for providing a light beam;
a rotation plate, disposed on the base;
an optical fiber, disposed on the base and having an input end and a first output end, wherein the rotation plate drives the optical fiber to rotate around a rotation axis, the rotation axis passes through the input end, and the light beam entering the optical fiber from the input end is transmitted in the optical fiber and output from the first output end; and
a lens module disposed at the first output end, wherein the light beam, after being output from the first output end, passes through the lens module and is converted to have a linear spot.

10. The optical base station according to claim 9, wherein the lens module is a single lenticular lens, or the lens module comprises a condenser lens and a lenticular lens sheet.

11. The optical base station according to claim 9, further comprising a lens disposed at the input end, wherein the light beam enters the input end after passing through the lens.

12. The optical base station according to claim 9, wherein the optical fiber further has a second output end, the light beam, after entering the optical fiber from the input end, is divided to respectively output a first sub light beam and a second sub light beam from the first output end and the second output end.

13. The optical base station according to claim 12, further comprising a first lens module and a second lens module respectively disposed at the first output end and the second output end, wherein the first sub light beam, after being output from the first output end, passes through the first lens module and is converted to have a first linear spot, the second sub light beam, after being output from the second output end, passes through the second lens module and is converted to have a second linear spot, the rotation axis is neither parallel nor vertical to a longitudinal axis of the first linear spot and a longitudinal axis of the second linear spot, and the longitudinal axis of the first linear spot is not parallel to the longitudinal axis of the second linear spot.

14. The optical base station according to claim 9, wherein the optical fiber further has a second output end, a third output end and a fourth output end, and the light beam, after entering the optical fiber from the input end, is divided to respectively output a first sub light beam, a second sub light beam, a third sub light beam and a fourth sub light beam from the first output end, the second output end, the third output end and the fourth output end.

15. The optical base station according to claim 9, further comprising a package disposed on the rotation plate, wherein the optical fiber is embedded in the package, and the input end is exposed from the package.

16. The optical base station according to claim 9, wherein the rotation plate has a through hole, and the light beam enters the optical fiber from the input end after passing through the rotation plate from the through hole.

* * * * *